United States Patent
Miyajima

(10) Patent No.: US 8,188,632 B2
(45) Date of Patent: May 29, 2012

(54) MINIATURE MOTOR, AND ITS MANUFACTURING METHOD

(75) Inventor: Yusuke Miyajima, Matsudo (JP)

(73) Assignee: Mabuchi Motor Co., Ltd., Chiba (JP)

( * ) Notice: Subject to any disclaimer, the term of this patent is extended or adjusted under 35 U.S.C. 154(b) by 285 days.

(21) Appl. No.: 12/595,097

(22) PCT Filed: Apr. 8, 2008

(86) PCT No.: PCT/JP2008/056914
§ 371 (c)(1),
(2), (4) Date: Oct. 8, 2009

(87) PCT Pub. No.: WO2008/126834
PCT Pub. Date: Oct. 23, 2008

(65) Prior Publication Data
US 2010/0084941 A1  Apr. 8, 2010

(30) Foreign Application Priority Data
Apr. 10, 2007  (JP) ................................. 2007-102477

(51) Int. Cl.
*H02K 3/28* (2006.01)
(52) U.S. Cl. ...................................................... 310/225
(58) Field of Classification Search .................. 310/198, 310/220, 223, 219, 224–225, 234; 29/598
See application file for complete search history.

(56) References Cited

U.S. PATENT DOCUMENTS

| | | | | |
|---|---|---|---|---|
| 4,270,065 A | * | 5/1981 | Major | 310/207 |
| 4,417,388 A | * | 11/1983 | Major | 29/598 |
| 4,618,794 A | * | 10/1986 | Rampignon | 310/234 |
| 6,079,659 A | * | 6/2000 | Yamamura et al. | 242/433.2 |
| 2006/0244334 A1 | | 11/2006 | Furui | |

FOREIGN PATENT DOCUMENTS

| | | |
|---|---|---|
| JP | 02-114841 | 4/1990 |
| JP | 6-2463 | 1/1994 |
| JP | 2002-354735 | 12/2002 |
| JP | 2003-189572 | 7/2003 |
| JP | 2005-341654 | 12/2005 |
| JP | 2006-311685 | 11/2006 |

* cited by examiner

*Primary Examiner* — Tran Nguyen
(74) *Attorney, Agent, or Firm* — McGlew and Tuttle, P.C.

(57) ABSTRACT

A type-A winding represented by a triangle of solid lines is connected to commutator segments such that its one end is connected to an arbitrary commutator segment and its other end is connected to a commutator segment adjacent to the arbitrary commutator segment. A type-B winding represented by a diamond of broken lines is connected to commutator segments such that its one end is connected to a commutator segment located radially opposite to a usual adjacent commutator segment. The type-A windings and the type-B windings are used in combination. One short circuit wire is used for every short circuit connection of radially opposed commutator segments. A total number of the short circuit wires is half (5) the number (10) of commutator segments. Thus, the number of electric wires hooked at every commutator segment can be reduced to two or less. Also, continuous winding by use of one or two wires is possible.

16 Claims, 16 Drawing Sheets

COMMUTATOR

PAIR OF BRUSHES

ANOTHER PAIR OF BRUSHES

PAIR OF BRUSHES

<u>PRIOR ART</u>

WINDING
SHORT CIRCUIT WIRE
COMMUTATOR SEGMENT
WINDING

<u>PRIOR ART</u>

TWO SHORT CIRCUIT WIRES
COMMUTATOR SEGMENT (a) 
ELECTRIC WIRE CONNECTION PORTION
COMMUTATOR SEGMENT
COMMUTATOR CORE
SHAFT (b) 
ELECTRIC WIRE (c) 
SPOT WELDING (d) 
ELECTRIC WIRE

FIG. 19(A)
FIG. 19(B)
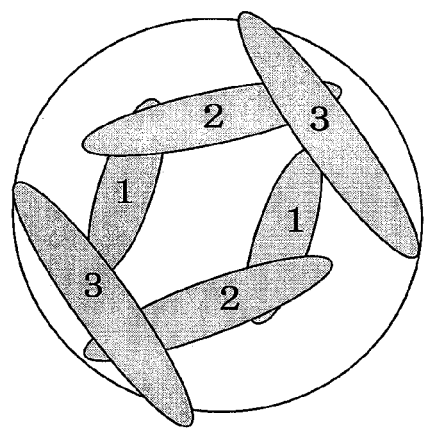
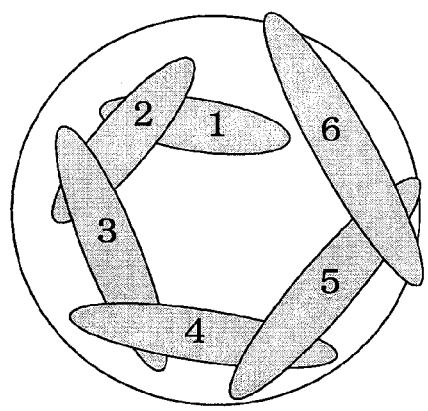
FIG. 20
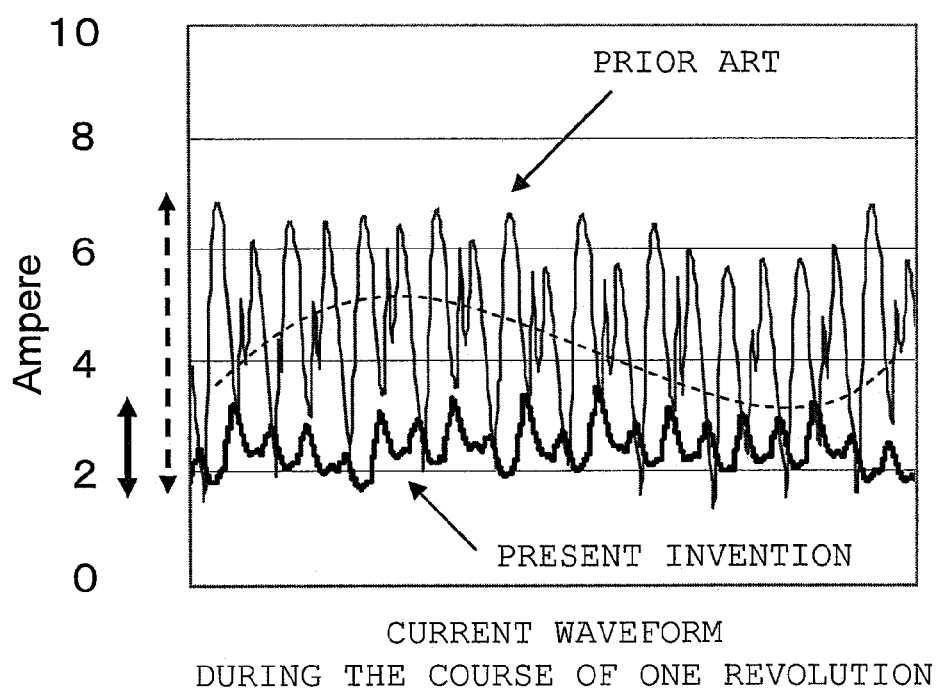
CURRENT WAVEFORM
DURING THE COURSE OF ONE REVOLUTION

MINIATURE MOTOR, AND ITS MANUFACTURING METHOD

TECHNICAL FIELD

The present invention relates to a miniature motor which enables continuous execution for winding rotor pole windings, connecting the rotor pole windings to commutator segments, and connecting a short circuit wire to two commutator segments located radially opposite each other, and to a manufacturing method of the miniature motor.

BACKGROUND ART

A 4-pole field DC miniature motor is used in a field which requires large output power, such as a field of motor-driven tools. FIG. 16 is a development view showing the principle of conventional rotor windings for a 4-pole field DC miniature motor (refer to Patent Document 1). The principle of conventional winding will be described for the case of six rotor poles and six commutator segments, taking an example of so-called multipolar winding in which winding is wound about three rotor poles. The illustrated winding is continuously performed by use of two electric wires. The solid line shows a first winding which starts from a commutator segment a, and the broken line shows a second winding which starts from a commutator segment a'.

In FIG. 16, commutator segments a and a', b and b', and c and c' are respectively located radially opposite each other on a commutator. The first winding indicated by the solid line starts winding from the commutator segment a; is wound about rotor poles 3, 2, and 1 by predetermined turns; is connected (hooked) to the next adjacent commutator segment b; and is then connected to the commutator segment b' located radially opposite the commutator segment b. A portion of the first winding which connects the commutator segments b and b' is indicated as a short circuit wire. Then, the first winding continues from the commutator segment b'; is similarly wound about rotor poles; is connected to adjacent commutator segment c'; and is then connected to the commutator segment c located radially opposite the commutator segment c'. Then, the first winding continues from the commutator segment c and is finally connected, via the commutator segment a', to the commutator segment a, from which winding has started. Similarly, the second winding indicated by the broken line starts from the commutator segment a' and ends at the commutator segment a'.

FIG. 17 is a development view showing rotor windings of an actually manufactured conventional 4-pole field DC miniature motor. Conventional winding will be described for the case of 10 rotor poles and 10 commutator segments, taking an example of so-called multipolar winding in which winding is wound about three rotor poles. In FIG. 17, for clear representation, the rotor poles are shown in two vertically separated rows; however, the same number indicates the same rotor pole. The illustrated winding is continuously performed by use of two electric wires. The first winding starting from the commutator segment a is shown under a row of commutator segments, and the second winding starting from commutator segment a' is shown above the row of commutator segments. In FIG. 17, S denotes a winding start point, and E denotes a winding end point. The method of winding is as shown in FIG. 17 and is basically similar to that shown in FIG. 16. Thus, description of the winding method is omitted.

A 4-pole field DC miniature motor as shown in FIG. 16 or 17 actually requires short circuit wires for connecting radially opposed commutator segments when a pair of brushes is used or when, although two pairs of brushes are used, accuracy of motor rotation is required to be improved further. The illustrated wiring method enables winding about rotor poles and connection of short circuit wires to be continuously performed by use of two electric wires.

However, such a winding method requires hooking of three electric wires at the winding start and end commutator segments. For example, in FIG. 17, electric wires gather at the commutator segment a as follows: in addition to the first hooking of a winding start wire and the second hooking of a winding end wire, an electric wire from a commutator segment e is wound about rotor poles, is third hooked to the commutator segment a, and is then connected to the commutator segment a' located radially opposite the commutator segment a. The hooked electric wires are spot-welded to the respective commutator segments for electrical connection and mechanical fixation. In the case where rotor windings use a thick wire for implementing a motor having large output power, difficulty is encountered in spot welding.

FIG. 18 is a series of views for explaining connection of electric wires to a commutator segment. As shown in (a) of FIG. 18(A), an end portion of a commutator segment located on a cylindrical commutator core fixed on a shaft is bent, thereby forming an electric wire connection portion. Next, as shown in (b), electric wires are hooked in a clearance formed between the electric wire connection portion and the commutator segment. Next, as shown in (c), a spot welding electrode is pressed against the electric wire connection portion, followed by spot welding. However, as shown in (d), when three thick electric wires are hooked, difficulty is encountered in spot welding. If the electric wire connection portion is elongated (a groove in which electric wires are hooked is deepened) for improvement of spot weldability, the entire motor length increases. Thus, because of limitation on motor dimensions, such a dimensional increase is disabled.

According to the winding method shown in FIG. 16 or 17, in order to enable winding about rotor poles and connection of short circuit wires through continuous winding operation, radially opposed commutator segments are connected twice; i.e., radially opposed commutator segments are connected through two short circuit wires. Thus, in a region between the commutator and the rotor poles, the short circuit wires gather toward the commutator. Particularly, when a thick electric wire is used, the electric wires gather bulkily in the vicinity of the commutator segments. Also, winding appearance becomes nonuniform, resulting in a difference in winding resistance among windings. Therefore, performance (current) becomes unstable.

FIGS. 19(A) and 19(B) are a pair of conceptual views for explaining the nonuniformity of winding appearance, showing windings as viewed from a rotor thrust direction. FIG. 19(A) shows a case where, by use of two electric wires, six windings are continuously wound through simultaneous winding of every two windings. FIG. 19(B) shows a case where, by use of one electric wire, six windings are continuously wound. In either case, multipolar winding is employed, and numbers assigned to windings indicated by respective ellipses in FIGS. 19(A) and 19(B) indicate the sequence of winding. A lateral projection of a winding 1, which is wound first, is small. Since a subsequent winding is wound on the preceding winding, a lateral projection of the subsequent winding increases (winding appearance becomes nonuniform). The nonuniformity of winding appearance is accelerated through bulky gathering of short circuit wires in the vicinity of commutator segments and through use of a thick electric wire. Since the electric resistance of each winding connected between two commutator segments depends on the entire length of winding, the electric resistance of each winding sequentially increases toward the last wound winding. In a 4-pole field DC motor, current flows to two radially opposed windings at the same timing, thereby compositely generating magnetic fields of the same direction. Particularly, when, as shown in FIG. 19(A), two windings of small resistance and two windings of large resistance are disposed respectively in a radially opposed manner, current which flows during the course of one revolution of rotor fluctuates greatly.

FIG. 20 is a view showing fluctuations of current waveform during the course of one revolution of the rotor. In FIG. 20, "prior art" shows fluctuations in measured current waveform of a miniature motor having windings wound as shown in FIG. 17. In contrast to a miniature motor of the present invention (first embodiment to be described later with reference to FIGS. 6 and 7), the prior art miniature motor has exhibited, in measurement, great fluctuations in current which flows during the course of one revolution of the rotor.

In the winding method shown in FIG. 16 or 17, the opposite ends of each winding coil wound about rotor poles are connected to respective commutator segments, and radially opposed commutator segments are connected through a short circuit wire, whereby two radially opposed windings are connected in parallel to a DC power supply. However, the series connection of windings is also known. FIG. 21 is a view for explaining an example of windings in general series connection. As shown in FIG. 21, winding starts from the commutator segment a; winding 1 is wound about the rotor poles 3, 2, and 1 by predetermined turns; continuously in series with the winding 1, a winding 2 is wound about rotor poles 8, 7, and 6; and then the winding 2 is connected to the next adjacent commutator segment b. Then, the commutator segment b is connected, through a short circuit wire, to the commutator segment b' located radially opposite the commutator segment b. Subsequently, winding continues in a similar manner. In such series connection of windings, two windings are connected in series between adjacent commutator segments. Thus, radially opposed commutator segments are connected to each other only through one short circuit wire, so that the above-mentioned problem of hooking of three electric wires does not arise. However, the series connection of windings is inferior in performance to the parallel connection of windings. By means of halving the number of winding turns and doubling the area (thickness) of an electric wire, the series connection of windings can exhibit performance similar to that of the parallel connection of windings. However, winding a thick electric wire for a miniature motor imposes a strain on manufacture. Also, winding of a thick wire increases the degree of the nonuniformity of winding appearance; thus, a difference in resistance arises among rotor windings.

Patent Document 1: Japanese Utility Model Publication (kokoku) No. H6-2463

DISCLOSURE OF THE INVENTION

Problems to be Solved by the Invention

An object of the present invention is to provide a DC miniature motor having a four-or-more-pole field which includes short circuit wires for parallel connection so as to enable continuous winding of rotor windings of parallel connection, that is advantageous in performance, and which facilitates electric connection and mechanical fixation of electric wires to commutator segments through limitation on the number of electric wires hooked to a commutator segment to two or less.

Means for Solving the Problems

The present invention provides a miniature motor and its manufacturing method in which magnets are mounted on an inner circumferential surface of a motor casing in such a manner that their N and S poles are alternatingly inverted, so as to serve as field magnets, an even number of rotor poles and a commutator having the same number of commutator segments as that of the rotor poles are fixed on a rotary shaft, each of the rotor poles has a salient magnetic pole core and a winding wound about a single salient magnetic pole core or a plurality of salient magnetic pole cores, opposite ends of the winding are connected to respective commutator segments, and a short circuit wire connects two commutator segments located radially opposite each other. The windings each connected to the commutator segments are a combination of first-type windings and second-type windings, the first-type winding being connected to adjacent commutator segments such that its one end is connected to one of the adjacent commutator segments and its other end is connected to the other one of the adjacent commutator segments, the second-type winding being connected to commutator segments such that at least its one end is connected to a commutator segment located radially opposite to one of adjacent commutator segments to which the ends of the winding would be connected if the winding were of the first type. Only one short circuit wire is used for every short circuit connection of radially opposed commutator segments.

When the number of the commutator segments equal to the even number of the rotor poles is represented by 2×N, N is an integer, and each pair of windings consists of two windings located radially opposite each other, the first-type windings and the second-type windings are used in combination such that, when N is an even number, each of at least N/2 pairs consists of the first-type winding and the second-type winding and each of the remaining pairs consists of the first-type winding and the second-type winding or consists of the two first-type windings, or such that, when N is an odd number, each of at least (N−1)/2 pairs consists of the first-type winding and the second-type winding and each of the remaining pairs consists of the first-type winding and the second-type winding or consists of the two first-type windings.

The present invention also provides a rotor of a miniature motor in which, while windings are wound continuously by use of one or two electric wires, two or one electric wire is hooked to an electric wire connection portion of each of the commutator segments. When the number of the commutator segments equal to the even number of the rotor poles is represented by 2×N, N is an integer, and each pair of commutator segments consists of two commutator segments located radially opposite each other, each of (N−1) pairs out of a total of N pairs consists of a commutator segment at which four electric wires gather, and a commutator segment at which two electric wires gather. The remaining one pair including commutator segments at which winding starts and ends is such that, when winding starts and ends at the same commutator segment, the one pair consists of a commutator segment at which four electric wires gather, and a commutator segment at which winding starts and ends and at which two electric wires gather, and such that, when winding starts and ends at respectively different commutator segments located radially opposite each other, the one pair consists of two commutator segments at which three electric wires gather respectively.

Effects of the Invention

According to the present invention, for continuous winding of rotor windings in parallel connection, which is advantageous in performance, a DC miniature motor having a four-or-more-pole field can be configured such that only one short circuit wire is used for every short circuit connection of radially opposed commutator segments and such that the number of electric wires hooked to each commutator segment is limited to two or less.

Even when a thick electric wire is used, use of only one short circuit wire for every short circuit connection avoids a problem in which the electric wires gather bulkily in the vicinity of the commutator segments, which could otherwise result from the gathering of short circuit wires toward the commutator in a region between the commutator and the rotor poles, thereby restraining the nonuniformity of winding appearance and the nonuniformity of resistance among windings. Therefore, performance (current) can be stabilized.

BRIEF DESCRIPTION OF THE DRAWINGS

FIGS. 19(A) and 19(B) are a pair of conceptual views for explaining the nonuniformity of winding appearance, showing windings as viewed from the rotor side, FIG. 19(A) shows a case where, by use of two electric wires, six windings are continuously wound through simultaneous winding of every two windings, and FIG. 19(B) shows a case where, by use of one electric wire, six windings are continuously wound.

FIG. 20 is a view showing fluctuations of current waveform during the course of one revolution of the rotor.

BEST MODE FOR CARRYING OUT THE INVENTION

Figure 1B:
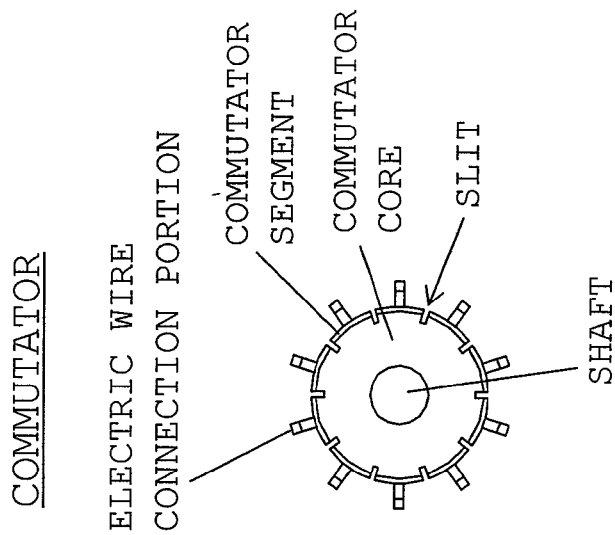
FIG. 1(B) is a view showing only a commutator.
Figure 1A:
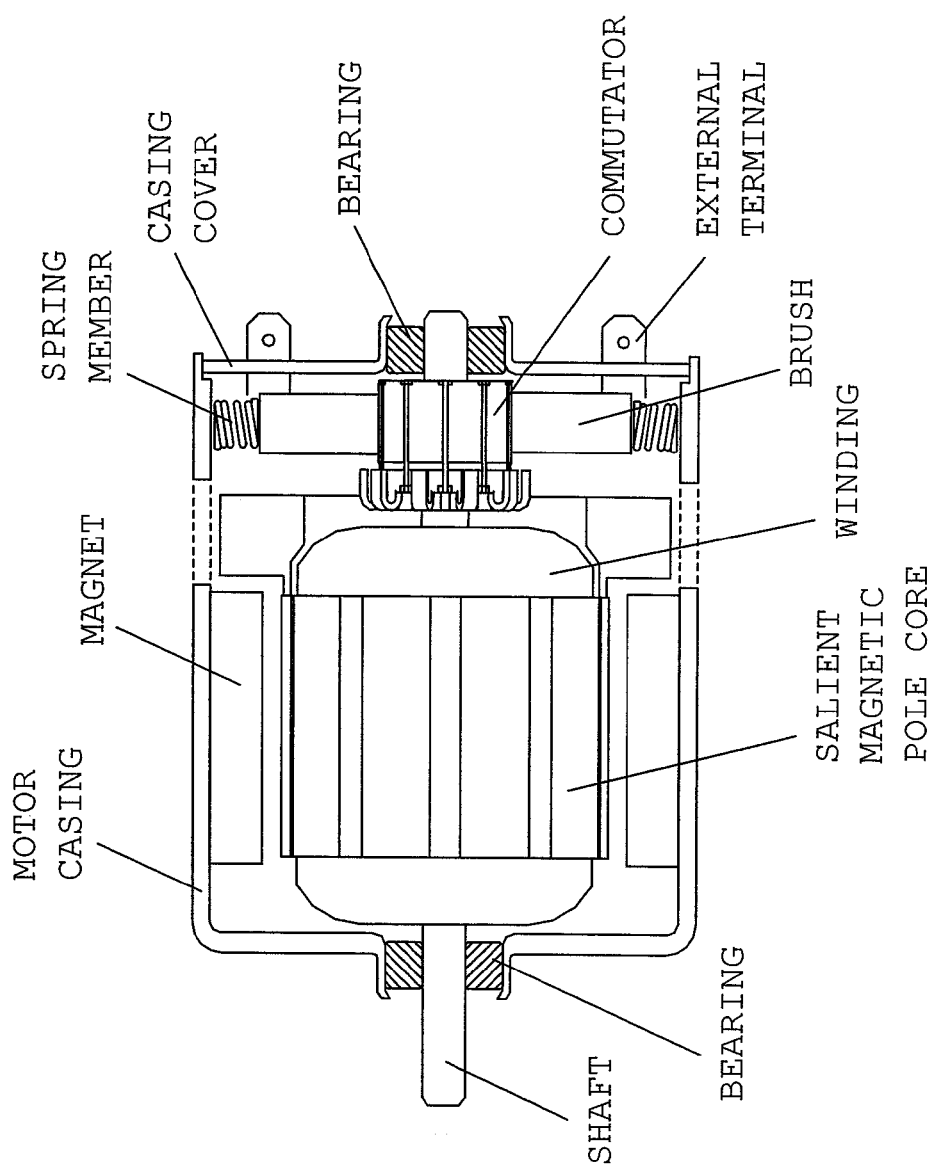
FIG. 1(A) is a vertical sectional view showing the entire 4-pole field miniature motor to which the present invention can be applied.

Embodiments of the present invention will next be described by way of example. Before description of the embodiments, a miniature motor to which the present invention can be applied will be described with reference to FIGS. 1 to 3. FIG. 1 is a pair of views showing a 4-pole field miniature motor to which the present invention can be applied, wherein FIG. 1(A) is a vertical sectional view showing the entirety of the motor, and FIG. 1(B) is a view showing only a commutator. In the illustrated motor, two pairs of magnets (four poles) are mounted on an inner circumferential surface of a motor casing, which is formed from a metallic material into a closed-bottomed tubular shape, in such a manner that their N and S poles are alternatingly inverted, so as to serve as field magnets. The present invention can be applied to a motor having a four-or-more-pole field. However, a 4-pole field miniature motor will be described below by way of example.

Figure 18:
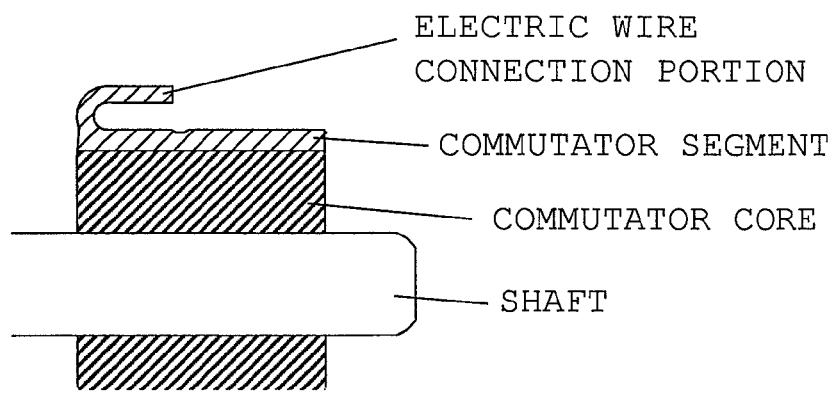
FIG. 18 is a series of views for explaining connection of electric wires to a commutator segment.
Figure 18:
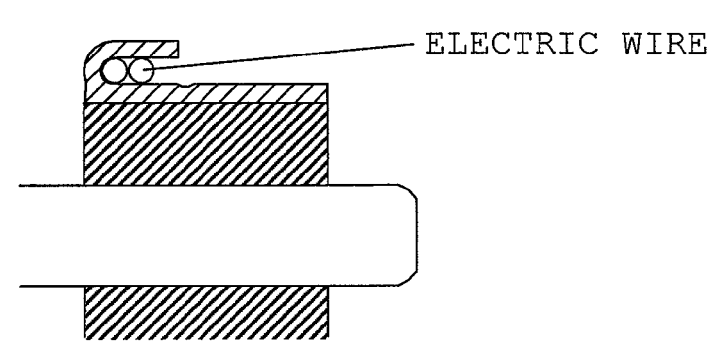
Figure 18:
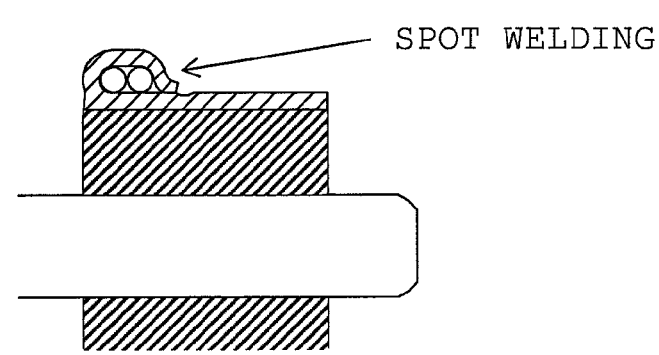
Figure 18:
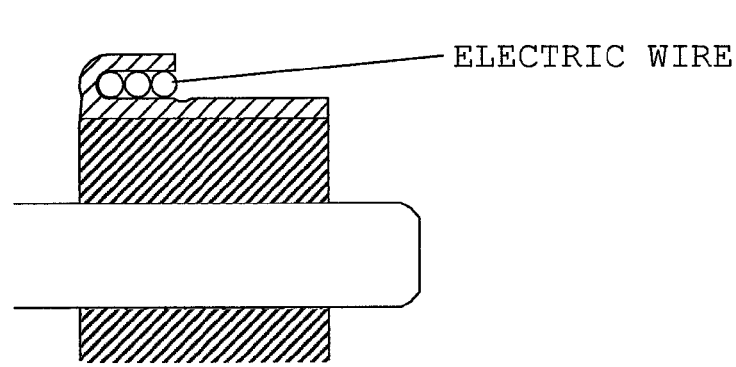
Figure 21:
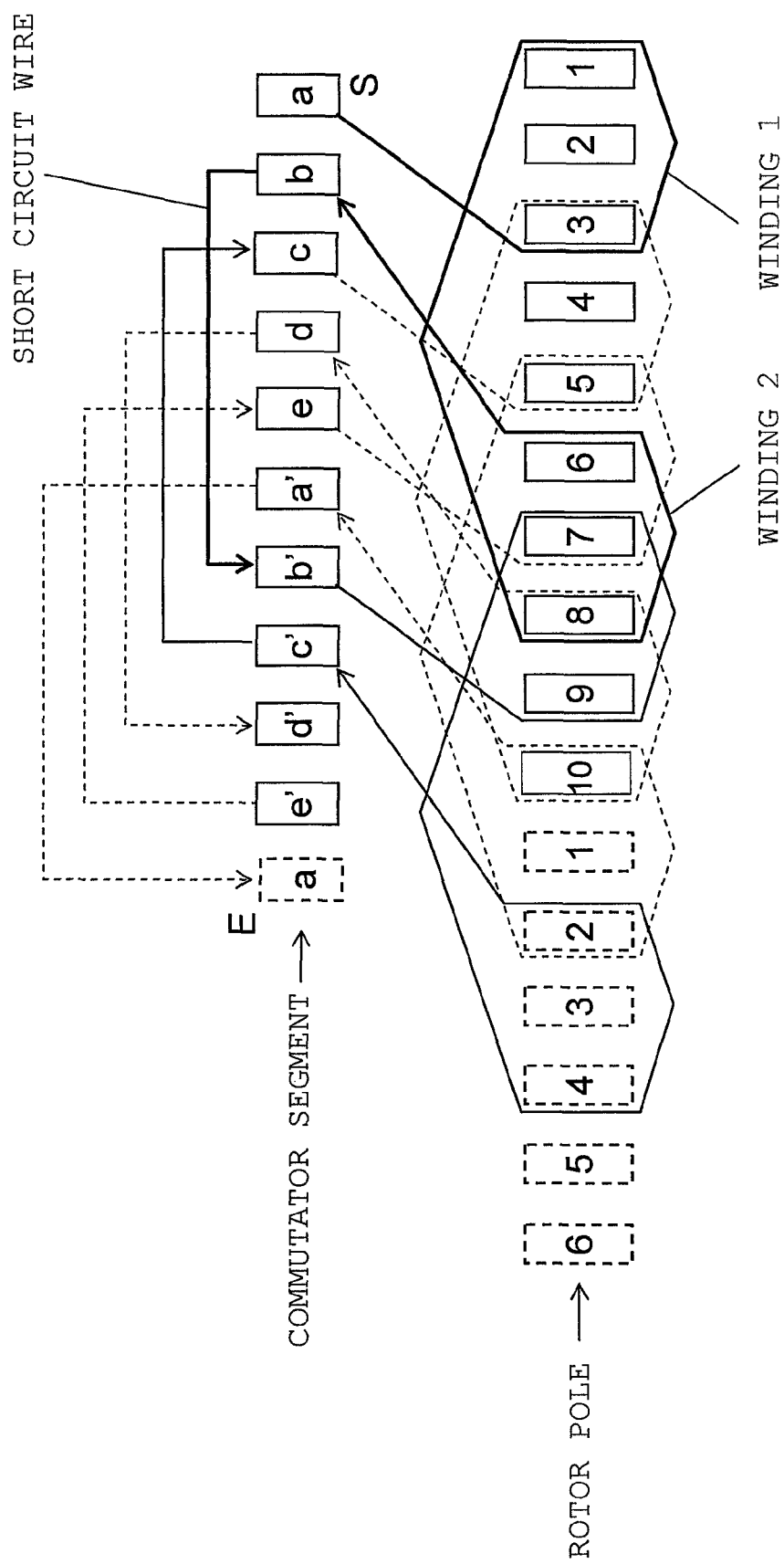
FIG. 21 is a view for explaining an example of windings in general series connection.

As shown in FIG. 1(A), a casing cover is fitted to an opening portion of the motor casing. A bearing for retaining a shaft is accommodated in a central portion of the casing cover. The other end of the shaft is supported by a bearing provided at the center of a bottom portion of the closed-bottomed tubular motor casing. An even number of rotor poles and a commutator having the same number of commutator segments as that of the rotor poles are fixed on the shaft, thereby forming a rotor of the miniature motor. Each of the rotor poles includes a laminated salient magnetic pole core and a winding wound about the salient magnetic pole core (connection of the winding to commutator segments is not shown). A pair of or two pairs of carbon brushes in contact with the commutator are supported by the casing cover via spring members. The brushes are electrically connected to a pair of external terminals. FIG. 1(B) illustrates a commutator having 10 commutator segments. The commutator segments are formed from an electrically conductive material and are separated from one another by slits on a commutator core, which is formed from an electrically insulative material (resin). An end portion of each of the commutator segments is bent so as to form an electric wire connection portion. End portions of windings wound about the salient magnetic pole cores are connected to respective electric wire connection portions, followed by spot welding (see FIG. 18).

Figure 2A:
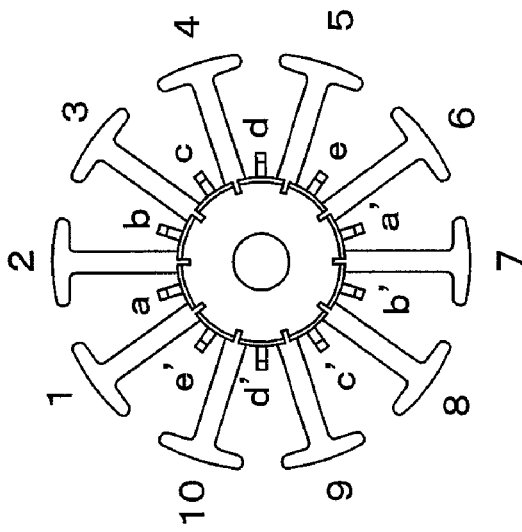
FIG. 2(A) is a front view showing a rotor before subjection to winding with its shaft laid horizontally.
Figure 2B:
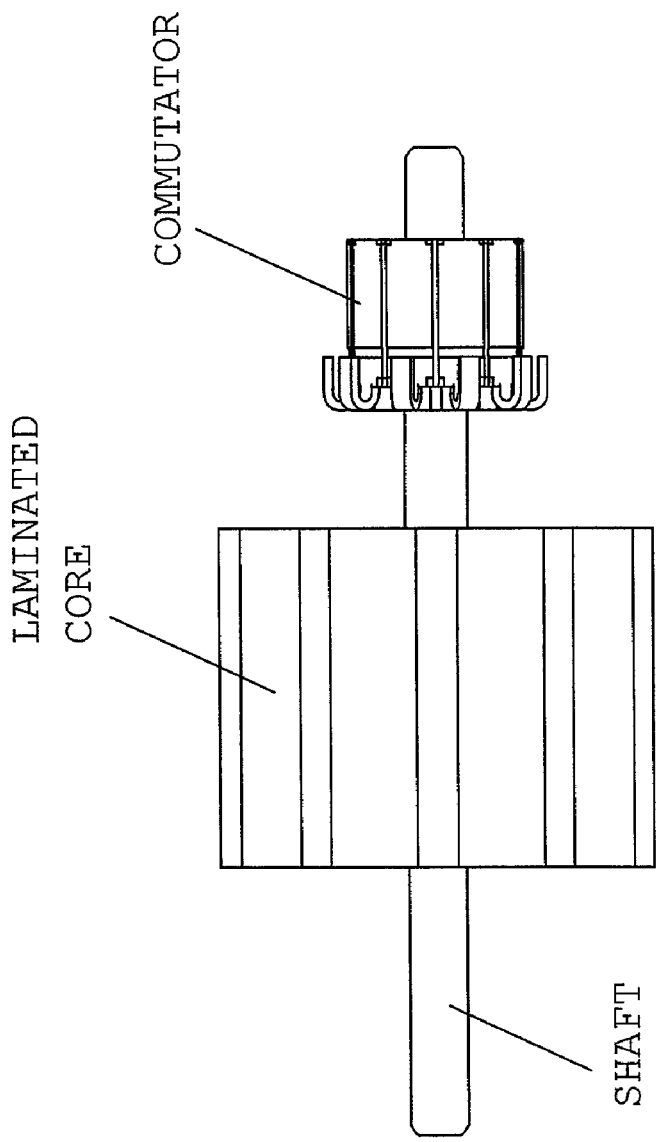
FIG. 2(B) is a side view of the rotor as viewed from the commutator side.
Figure 3A:
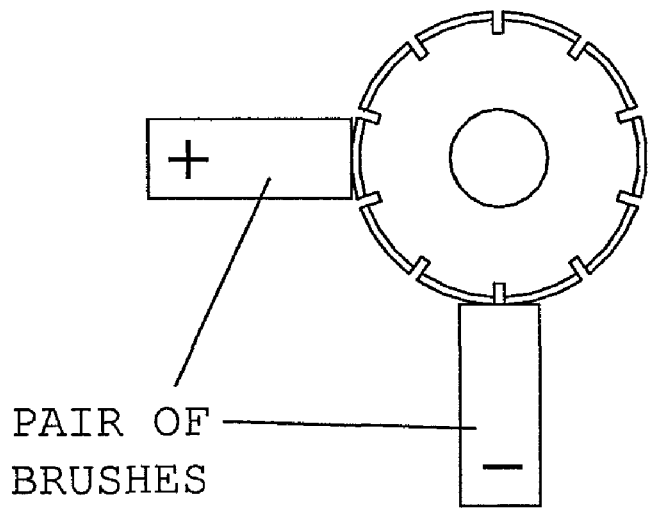
FIG. 3(A) is a view showing the positional relation of a pair of brushes to the commutator.
Figure 3B:
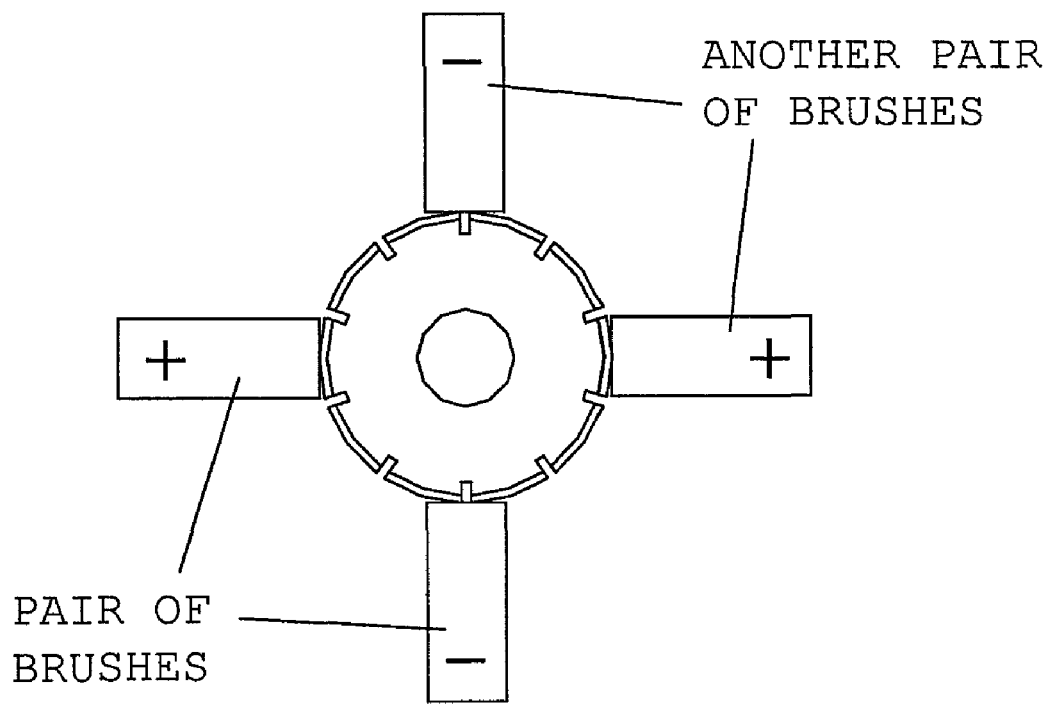
FIG. 3(B) is a view showing the arrangement of two pairs of brushes.

FIG. 2 is a pair of views showing the rotor before subjection to winding, wherein FIG. 2(A) is a front view showing the rotor with its shaft laid horizontally, and FIG. 2(B) is a side view of the rotor as viewed from the commutator side. FIG. 3 is a pair of views showing the positional relation of the brushes to the commutator, wherein FIG. 3(A) shows the arrangement of a pair of brushes, and FIG. 3(B) shows the arrangement of two pairs of brushes. In the case where the two pairs of brushes shown in FIG. 3(B) are connected to a DC power source while being arranged, for example, with the illustrated polarity, the two plus poles and the two minus poles are electrically connected together, respectively. In the illustrated example, the brushes are positionally aligned with the centers of the corresponding magnets.

As shown in FIG. 2(B), for the following description, the 10 illustrated commutator segments (and electric wire connection portions) are denoted by reference letters a to e and a' to e', and as many salient magnetic pole cores as the commutator segments are denoted by reference numerals 1 to 10. According to a basic winding method, a winding wound about each of the salient magnetic pole cores can be such that its opposite ends are connected to respective commutator segments. For example, opposite ends of a winding wound about one salient magnetic pole core 2 are connected to the commutator segments a and b. As in the case of the illustrated example, in order for the direction of current of a winding to alternate at the center of a field magnet, the centers of windings (the centers of salient magnetic pole cores) are made to coincide with the respective slits between commutator segments, whereby all of the windings wound about the salient magnetic pole cores can be connected in an electrically neutral manner (without positional misalignment with the slits between commutator segments). However, the present invention can be applied not only to the configuration in which electrical neutrality is established, but also to a configuration in which the rotor is advanced (or delayed) in angle. According to a known method for configuring the delayed angle structure, the radially opposed brushes are arranged in such a manner as to coincide with the respective centers of the N and S magnets, and the commutator segments of the rotor are arranged in such a manner as to be positionally shifted from the rotor poles in the rotational direction of rotor. The present invention can also be applied to a motor having such an advanced angle (or delayed angle) structure. Also, conventionally, in order to reduce, to the greatest possible extent, fluctuations in voltage and current which is switched on the commutator, multipolar winding in which winding is wound about two or three rotor poles has been carried out. The present invention can be applied not only to a unipolar winding structure in which each winding is wound about a single salient magnetic pole core, but also to a multipolar winding structure.

Figure 4A:
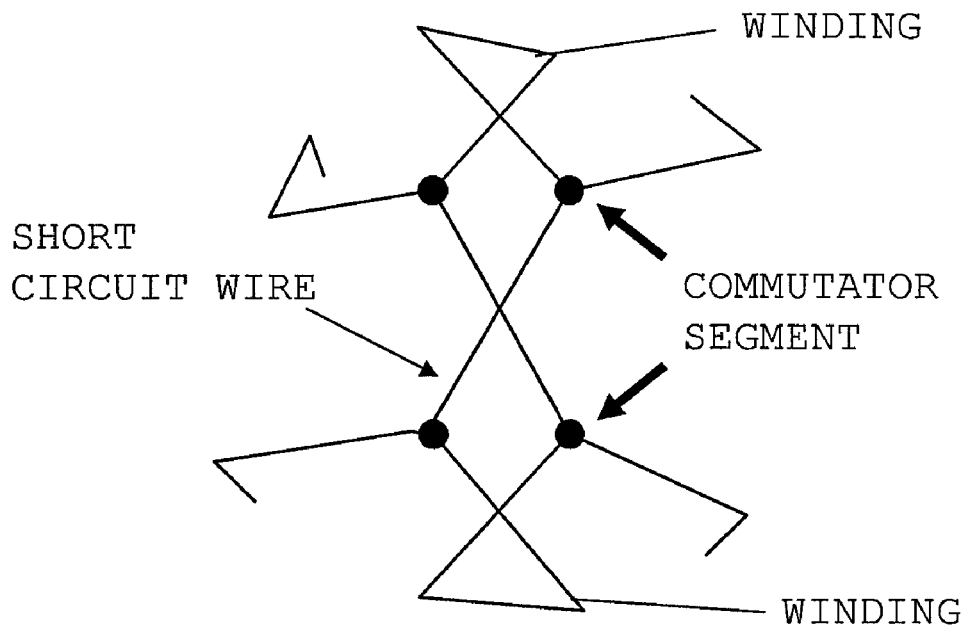
FIG. 4(A) is a conceptual view for explaining the principle of the simplest conventional wire connection for a 4-pole motor.
Figure 4B:
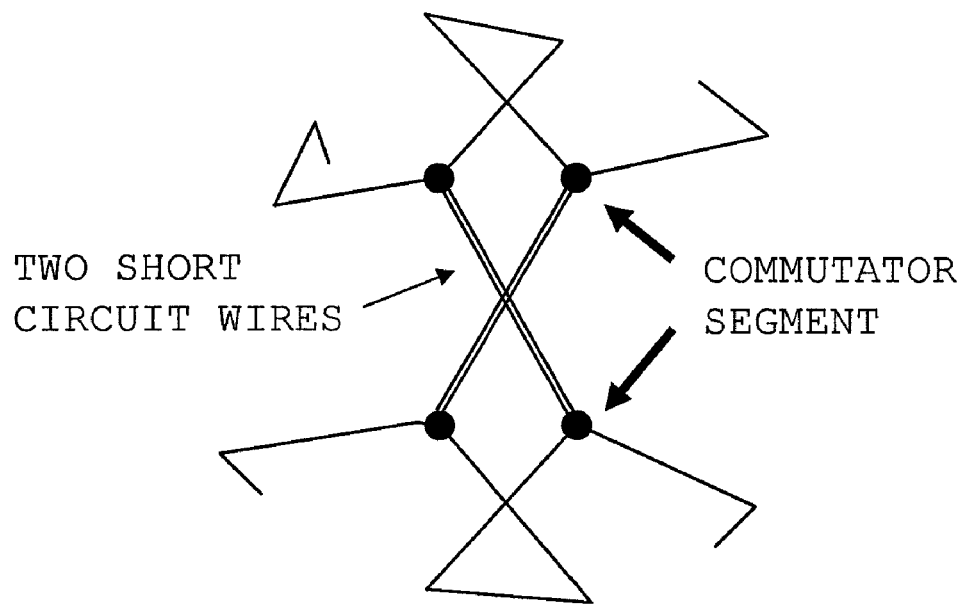
FIG. 4(B) is a view for explaining conventional continuous winding.
Figure 5A:
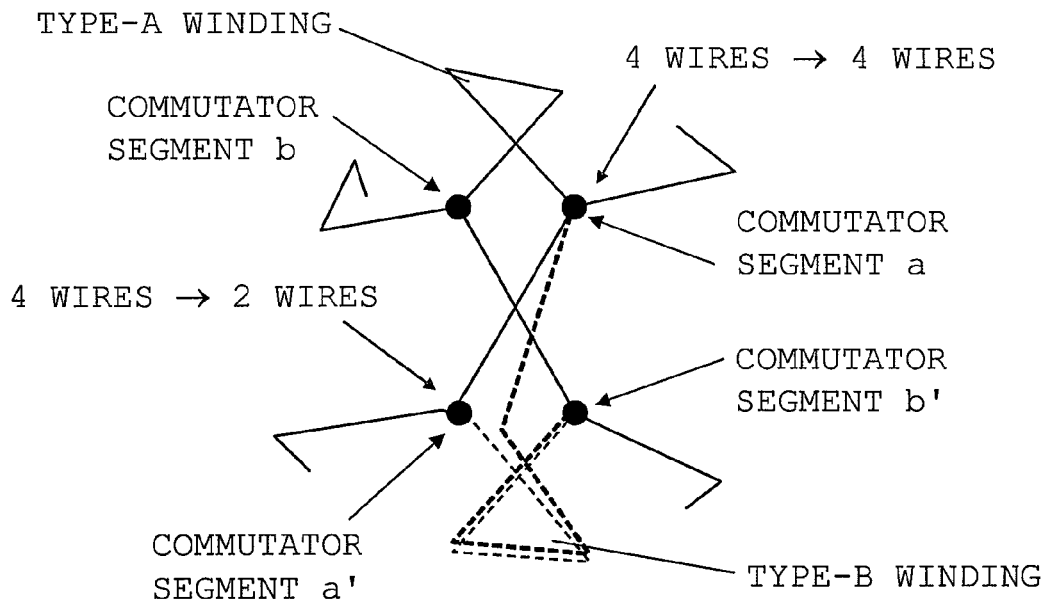
FIG. 5(A) is a view showing an example of winding for explaining the principle of the present invention.
Figure 5B:
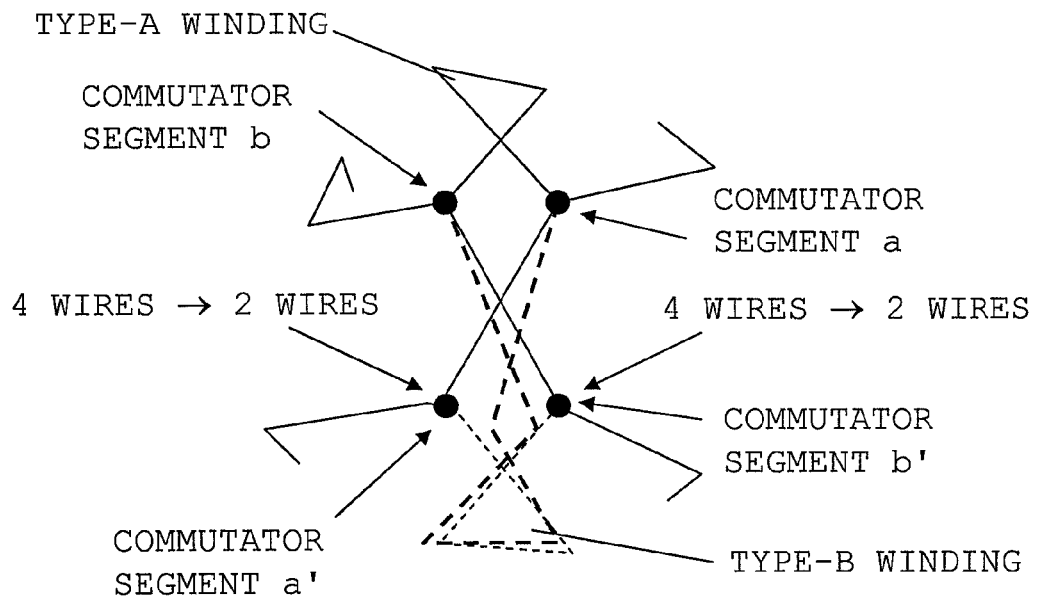
FIG. 5(B) is a view showing another example of winding of the present invention.

FIG. 4(A) is a view for explaining the principle of the simplest conventional wire connection for a 4-pole field motor. FIG. 4(B) shows conventional continuous winding. FIG. 5(A) is a view showing an example of winding for explaining the principle of the present invention. FIG. 5(B) is a view showing another example of winding of the present invention. In FIGS. 4 and 5, winding coils (only two of which are illustrated) are represented by respective triangles, and the opposite ends of each winding coil are connected to adjacent commutator segments, respectively.

Figure 16:
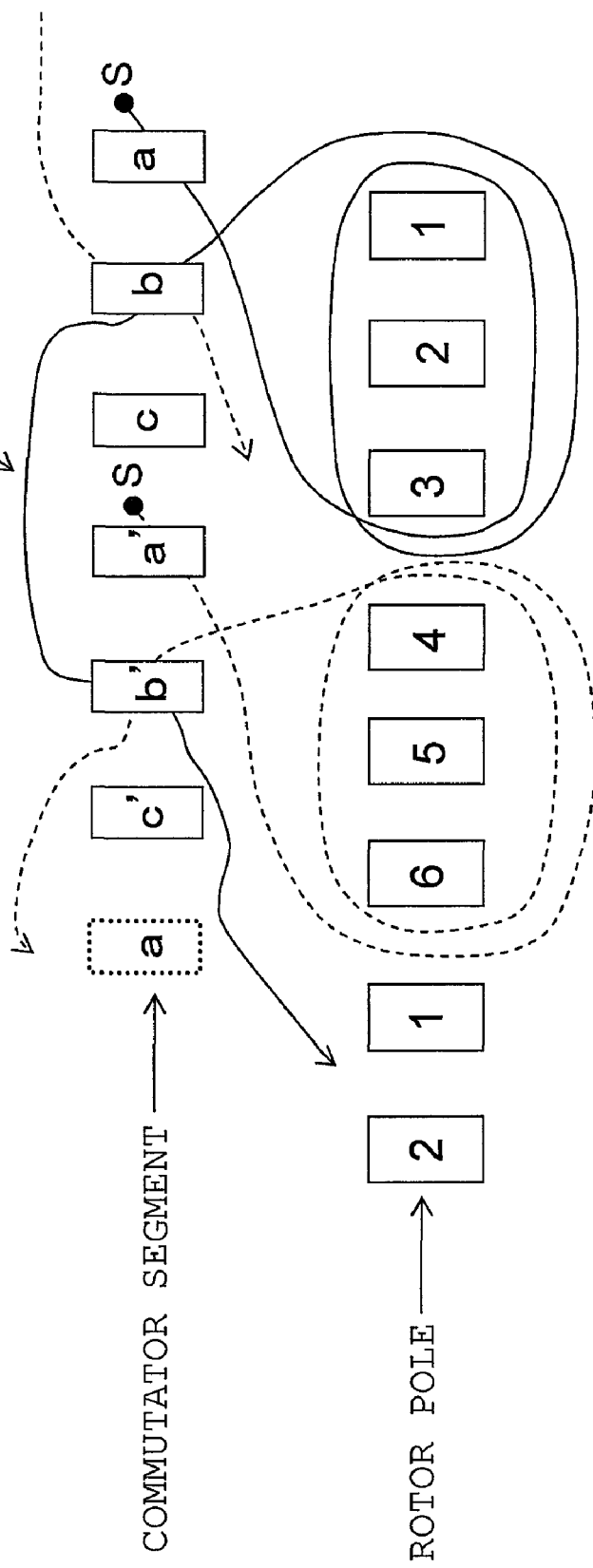
FIG. 16 is a development view showing the principle of conventional rotor windings for a 4-pole field DC miniature motor.
Figure 17:
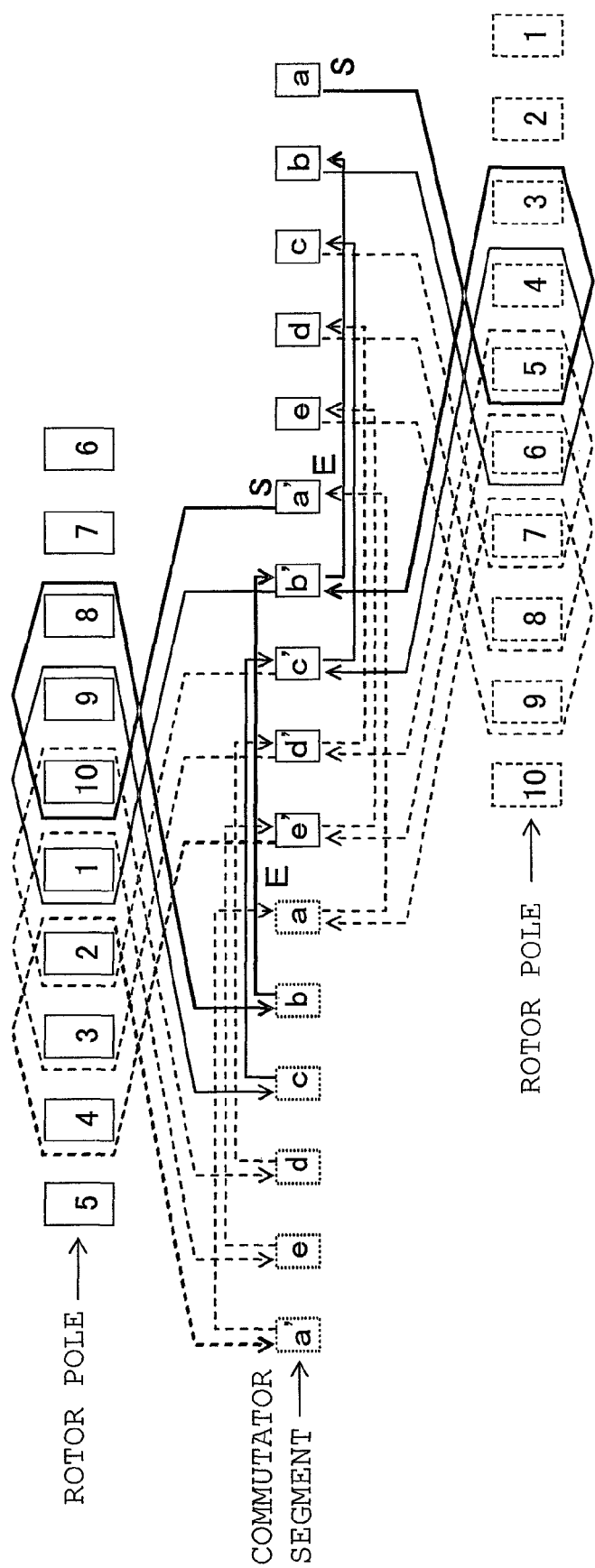
FIG. 17 is a development view showing rotor windings of an actually manufactured conventional 4-pole field DC miniature motor.

As shown in FIG. 4(A), according to the conventional simplest motor wire connection, three (an odd number of) electric wires; specifically, one ends of winding coils located on respective opposite sides of a commutator segment and a short circuit wire for connecting radially opposed commutator segments gather at every commutator segment. According to such a wire connection method, continuous winding is disabled. Thus, for example, winding is continuously performed without connection of short circuit wires; subsequently, short circuit wires are connected. For continuous winding, as shown in FIG. 4(B), two short circuit wires must be provided for each commutator segment. In this case, since four (an even number of) electric wires gather at every commutator segment, continuous winding by use of a winding machine is enabled. In the following description, hooking of a wire composed of a wire (portion) reaching a certain commutator segment and a wire (portion) leaving from the commutator segment will be referred to "hooking of one wire." Therefore, in continuous winding, four gathering wires involve hooking of a total of two wires. However, at the winding start commutator segment and the winding end commutator segment, hooking of a winding start electric wire and hooking of a winding end electric wire are additionally required, respectively. Thus, as described with reference to FIG. 16 or 17, at the winding start commutator segment and the winding end commutator segment, a total of three electric wires are hooked.

As shown in FIGS. 5(A) and 5(B), the present invention uses type-A winding and type-B winding in a combined manner. The type-A winding is connected between adjacent commutator segments. The type-B winding is connected to commutator segments such that at least its one end is connected to a commutator segment located radially opposite to one of adjacent commutator segments to which the ends of the winding would be connected if the winding were of the type-A (hereinafter, such a commutator segment will be referred to as a "commutator segment located radially opposite to a usual adjacent commutator segment"). The type-B winding illustrated in FIG. 5(A) is connected to commutator segments such that only one end thereof is connected to a commutator segment located radially opposite to a usual adjacent commutator segment. The type-B winding illustrated in FIG. 5(B) is connected to commutator segments such that both its opposite ends are connected to respective commutator segments located radially opposite to the adjacent commutator segments to which the ends of the winding would be connected if the winding were of the type-A (hereinafter, such commutator segments will be referred to as "commutator segments located radially opposite to usual adjacent commutator segments").

The type-B winding shown below in FIG. 5(A) (its one end is connected to a commutator segment located radially opposite to a usual adjacent commutator segment) is usually to be connected to the commutator segment a' and the commutator segment b' (see FIG. 4(B)), but is connected at its one end to the commutator segment a located radially opposite the commutator segment a'. This connection involves only one short circuit wire for connection of radially opposed commutator segments. Further, by contrast to FIG. 4(B), although the number of electric wires gathering at the commutator segment a in FIG. 5(A) remains unchanged; i.e., the number of gathering wires is four, the number of electric wires gathering at the commutator segment a' in FIG. 5(A) is reduced from four to two. Thus, when the commutator segment a' is an intermediate commutator segment in the midst of continuous winding, the number of hooked wires at the commutator segment a' is one. When the commutator segment a' is a winding start commutator segment or a winding end commutator segment, the number of hooked wires at the commutator segment a' is two.

Similarly, the type-B winding shown below in FIG. 5(B) (both its opposite ends are connected to respective commutator segments located radially opposite to usual adjacent commutator segments) is connected at its opposite ends to respective commutator segments located radially opposite to usual adjacent commutator segments (a specific connection example will be described later with reference to FIG. 12). The type-B winding is usually to be connected to the commutator segment a' and the commutator segment b' (see FIG. 4(B)), but is connected at its opposite ends to the commutator segment a and the commutator segment b, respectively. Thus, only one short circuit wire is required to connect radially opposed commutator segments. By contrast to FIG. 4(B), although the number of electric wires gathering at the commutator segments a and b in FIG. 5(B) remains unchanged; i.e., the number of gathering wires is four, the number of electric wires gathering at the commutator segments a' and b' in FIG. 5(B) is reduced from four to two. Thus, when the commutator segments a' and b' are intermediate commutator segments in the midst of continuous winding, the number of hooked wires at the commutator segments a' and b' is one. When each of the commutator segments a' and b' is a winding start commutator segment or a winding end commutator segment, the number of hooked wires at the commutator segments a' and b' is two.

In sum, when the number of commutator segments is taken as 2×N (N is an integer) similar to the number of rotor poles; i.e., N pairs of commutator segments are present, and each pair of commutator segments consists of two radially opposed commutator segments, (N−1) pairs of commutator segments which result from excluding, from N pairs, one pair of commutator segments at which winding starts and ends are such that four electric wires gather (two electric wires are hooked) at one commutator segment of each of the (N−1) pairs, whereas two electric wires gather (one electric wire is hooked) at the other commutator segment of each of the (N−1) pairs. In the case of the one pair of commutator segments at which winding starts and ends, the number of electric wires gathering at each commutator segment depends on whether winding starts and ends at the same commutator segment, or starts and ends at respectively different commutator segments located radially opposite each other. In the case where winding starts and ends at the same commutator segment (see, for example, FIG. 7), four electric wires gather at one of the paired commutator segments (two electric wires are hooked), whereas two electric wires gather at the other commutator segment at which winding starts and ends (two electric wires are hooked). In the case where winding starts and ends at respectively different commutator segments located radially opposite each other (see, for example, FIG. 9), three electric wires gather (two electric wires are hooked) at each of the commutator segments.

Figure 6:
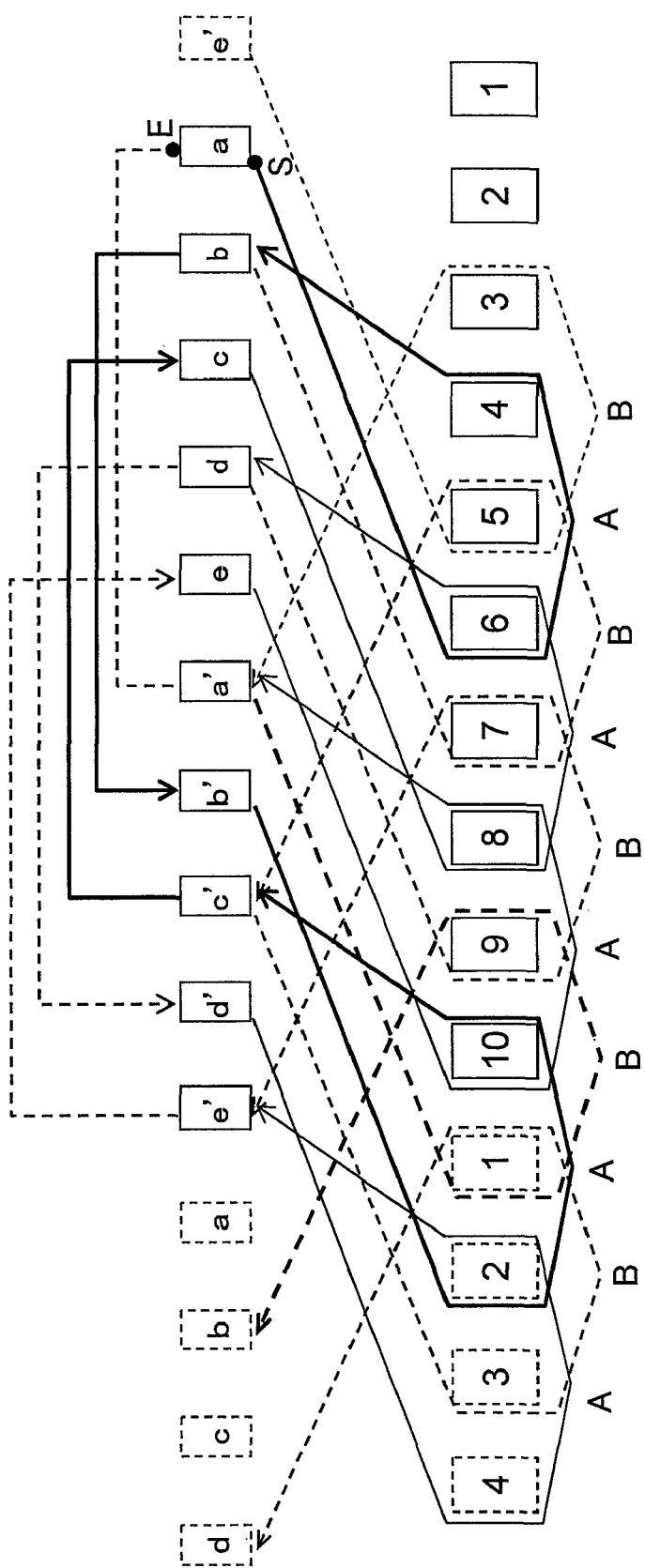
FIG. 6 is a development view illustrating rotor windings of a first embodiment of the present invention.
Figure 7:
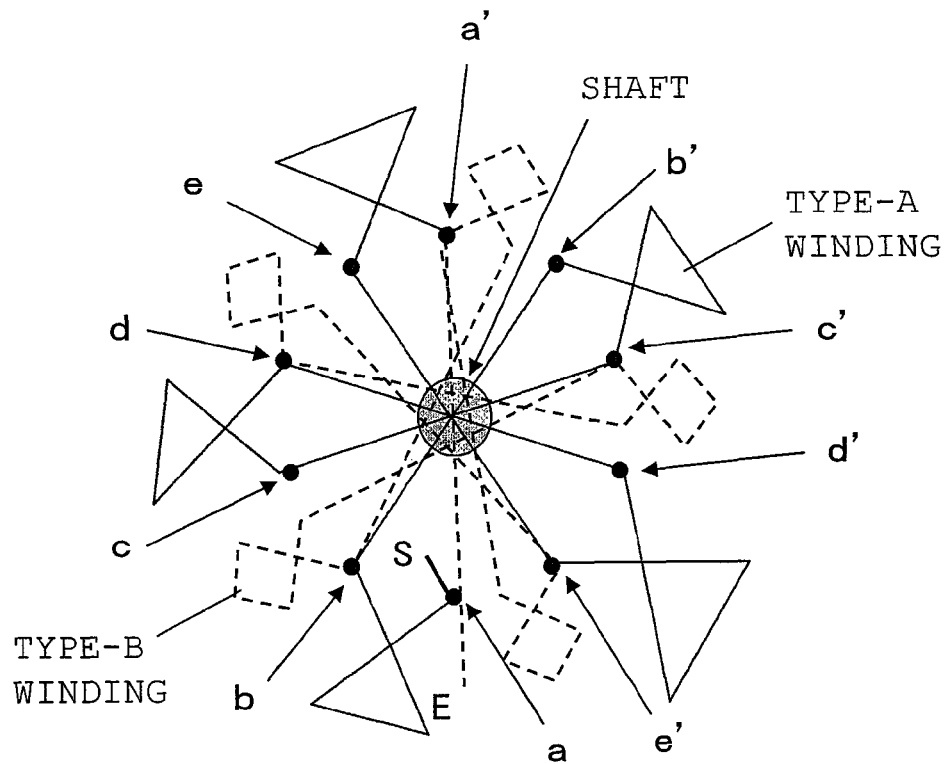
FIG. 7 is an explanatory view showing the windings of FIG. 6 in a circumferentially arranged manner.

Next, a first embodiment of the present invention will be described with reference to FIGS. 6 to 8. The first embodiment is a DC miniature motor which has a 4-pole field and one or two pairs of brushes and in which the number of rotor poles and the number of commutator segments are the same even number of six or greater represented by 2×N (N is an integer). FIG. 6 is a development view illustrating 10-slot rotor windings. FIG. 7 is an explanatory view showing the windings of FIG. 6 in a circumferentially arranged manner.

As described with reference to FIG. 5, there are two types of windings (type-A winding and type-B winding), which differ in the form of connection of the opposite ends of a winding coil to commutator segments. In FIG. 7, the type-A winding represented by a triangle of solid lines is connected to commutator segments such that its one end is connected to an arbitrary commutator segment and its other end is connected to a commutator segment adjacent to the arbitrary commutator segment. The type-B winding represented by a diamond of broken lines is connected to commutator segments such that its one end is connected to a commutator segment located radially opposite to a usual adjacent commutator segment (to which the type-A winding is to be connected). In the example shown in FIGS. 6 and 7, five (N) type-A windings and five (N) type-B windings are arranged alternatingly in a circumferential direction. The letters A and B appearing below in FIG. 6 indicate wiring types. One short circuit wire is used for every short circuit connection of radially opposed commutator segments, and a total number of the short circuit wires is half (5) the number (10) of commutator segments. Thus, the number of electric wires hooked at every commutator segment can be reduced to two or less. Also, continuous winding (winding without intermediate cutting) by use of one or two wires is possible.

Winding will further be described specifically. As shown in FIGS. 6 and 7, the commutator segment a serves as a winding start point S and a winding end point E. In the embodiments to be described below, the winding start point S and the winding end point E may be reversed; i.e., winding may start from the winding end point E and may end at the winding start point S. However, for the sake of convenience of description, winding starts from the winding start point S and ends at the winding end point E.

First, the first to N'th (fifth) windings are wound as type-A windings. Specifically, winding starts from the commutator segment a, and the electric wire is wound about the rotor poles 6, 5, and 4 for multipolar wining and is then hooked to the commutator segment b adjacent to the commutator segment a. Subsequently, the electric wire is hooked to the commutator segment b' located radially opposite the commutator segment b, thereby forming a continuous short circuit wire therebetween; is next wound about the rotor poles 2, 1, and 10; and is then hooked to the commutator segment c' adjacent to the commutator segment b'. Subsequently, winding is performed similarly. In order to wind the last type-A winding; i.e., the N'th (fifth) winding, the electric wire from the commutator segment e is wound about the rotor poles 10, 9, and 8 and is then connected to the commutator segment a' next adjacent to the commutator segment e.

Subsequently, the (N+1)'th to 2N'th (sixth to tenth) windings are wound as type-B windings. Specifically, winding starts from the commutator segment a', and the electric wire is wound about the rotor poles 1, 10, and 9 and is then hooked to the commutator segment b located radially opposite the commutator segment b', which is adjacent to the commutator segment a'. Subsequently, winding is performed similarly. Finally, in order to wind the 2N'th (tenth) winding, the electric wire from the commutator segment e' is wound about the rotor poles 5, 4, and 3. Subsequently, the electric wire is hooked to the commutator segment a' located radially opposite the commutator segment a and is then hooked to the initial commutator segment a, thereby completing winding.

Figure 8:
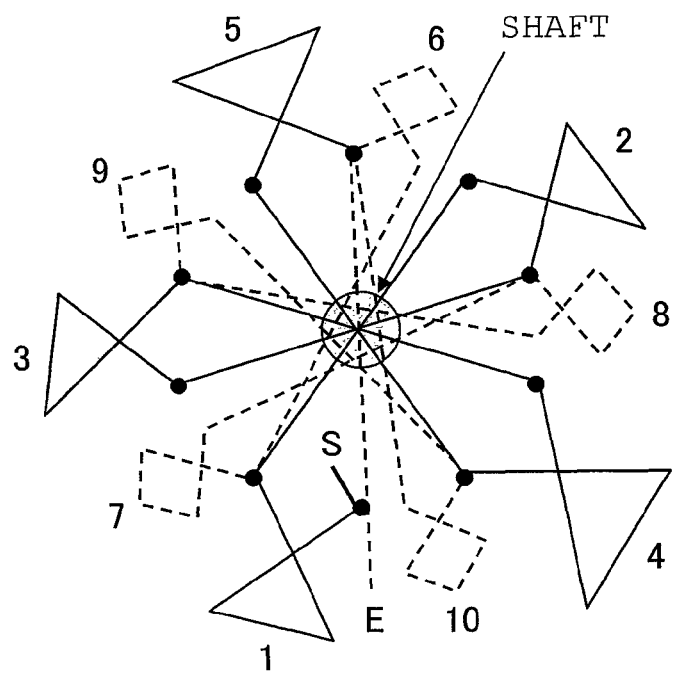
FIG. 8 is a view for explaining a winding sequence for the winding configuration shown in FIG. 7.

FIG. 8 is a view for explaining a winding sequence for the winding configuration shown in FIG. 7. The winding sequence is represented by numbers ranging from 1 to 10. The type-A winding represented by a triangle of solid lines and type-B winding represented by a diamond of broken lines are arranged alternatingly in a circumferential direction and in a radially opposed relation. A winding to be wound next to a certain winding is located adjacent to a winding located radially opposite the certain winding. However, the sixth winding to be wound after winding of the fifth winding is located adjacent to the fifth winding. This winding configuration enables continuous winding by use of one electric wire on a winding machine called a single flyer or by use of two electric wires on a winding machine called a double flyer. However, even in the case of winding by use of two electric wires, a winding start commutator segment and a winding end commutator segment must be selected so as to avoid hooking of three electric wires. As mentioned above, since windings can be sequentially wound in a well balanced manner in a circumferential direction, winding appearance does not become nonuniform, so that a difference in resistance among rotor windings is small. As described above with reference to FIG. 20, as compared with the prior art rotor, the rotor configured according to the first embodiment has exhibited, in measurement, small fluctuations in current which flows during the course of one revolution of the rotor.

As mentioned above, when a winding whose one end is connected to a commutator segment located at a radially opposite position is used as the type-B winding, and each pair of winding coils consists of two radially opposed winding coils, (N−1) pairs of winding coils each consist of the type-A winding and the type-B winding, and the remaining one pair of winding coils can consist of the type-A winding and the type-B winding or can consist of the two type-A windings. In the embodiments to be described below, the type-A winding and the type-B winding which are located radially opposite each other can be reversed in winding type. Referring to FIGS. 9 to 15, other typical embodiments will next be described.

Figure 9:
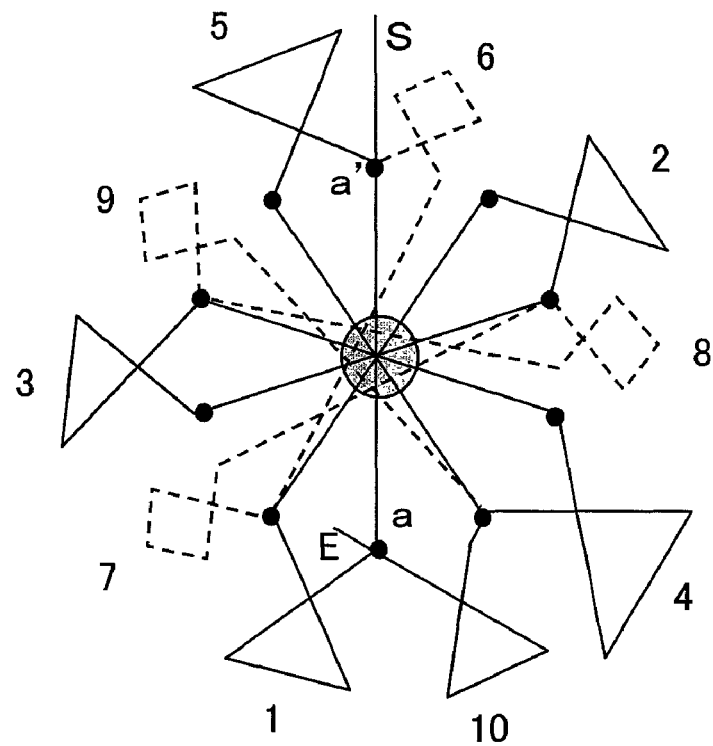
FIG. 9 is a view showing a second embodiment of the present invention.

FIG. 9 is a view showing a second embodiment of the present invention. The second embodiment differs from the above-described first embodiment in the winding start and end positions. According to the second embodiment, after the tenth winding is wound, the tenth winding is connected to the adjacent commutator segment a. Winding starts with a short circuit wire extending from the commutator segment a' to the commutator segment a. In this example, since the tenth winding is changed to a type-A winding, there are (N+1) type-A windings and (N−1) type-B windings. In other words, each of (N−1) pairs consists of the type-A winding and the type-B winding located radially opposite each other, whereas the remaining one pair consists of the two type-A windings located radially opposite each other.

Figure 10:
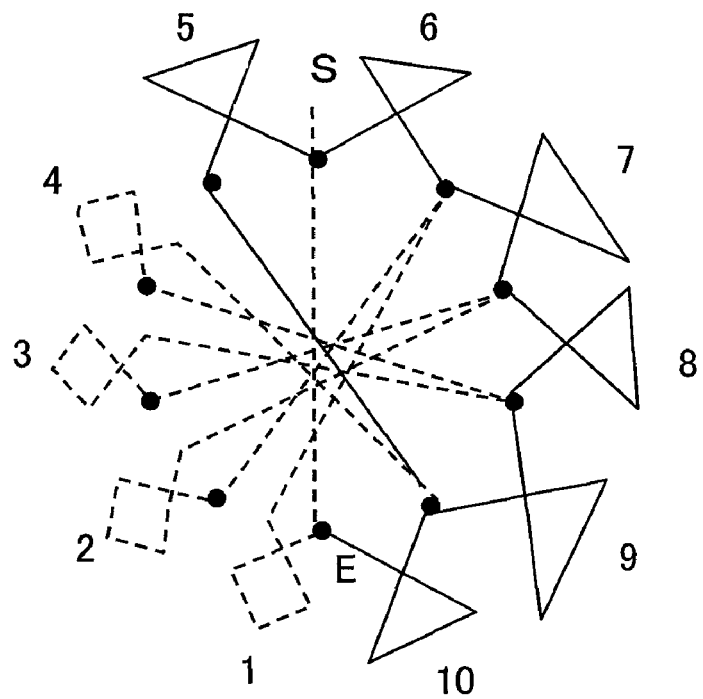
FIG. 10 is a view showing a third embodiment of the present invention.

FIG. 10 is a view showing a third embodiment of the present invention. A motor of the third embodiment has the same configuration as that of the above-described examples, but has a different winding sequence. Winding starts from the winding start point S and is performed in ascending order of number. The first four windings are type-B windings. Before winding of the fifth winding is started, connections of all short circuit wires are completed. The fifth and subsequent windings are type-A windings and are wound sequentially from one to an adjacent one without involvement of short circuit wire connection. Finally, the winding end of the tenth winding is hooked to an adjacent commutator segment, thereby completing the entire winding operation. The illustrated example has (N−1) type-B windings arranged in a sequentially adjacent relation, and (N+1) type-A windings arranged in a sequentially adjacent relation. Since winding is performed such that windings are arranged in a sequentially adjacent relation, winding appearance becomes nonuniform; however, only one short circuit wire is used for every short circuit connection of radially opposed commutator segments, and the number of hooked wires can be limited to two or less.

Figure 11:
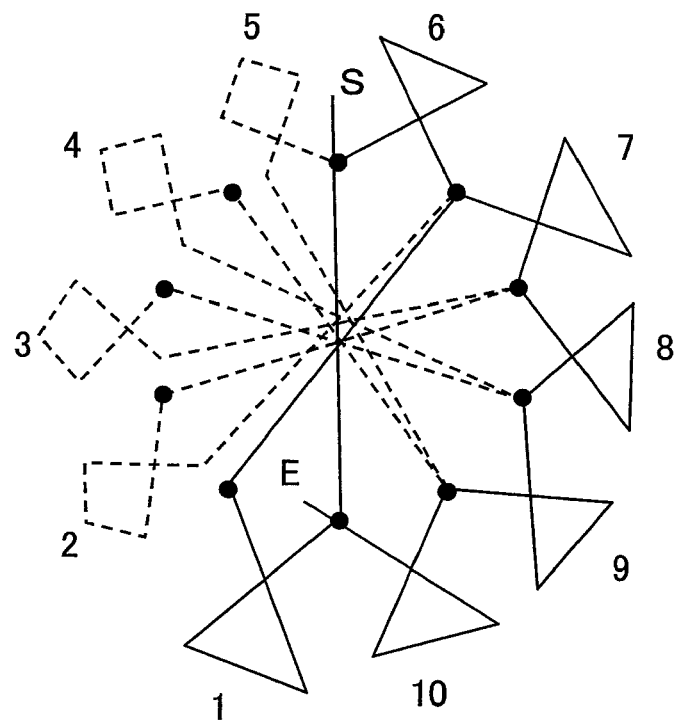
FIG. 11 is a view showing a fourth embodiment of the present invention.

FIG. 11 is a view showing a fourth embodiment of the present invention. The illustrated example has, subsequent to one type-A winding, (N−1) type-B windings arranged in a sequentially adjacent relation and N type-A windings arranged in a sequentially adjacent relation. Winding starts from the winding start point S and is performed in ascending order of number. The fourth embodiment differs from the above-described third embodiment in that the first winding is a type-A winding, and the fifth winding is a type-B winding. However, the fourth embodiment yields effects similar to those which the third embodiment yields.

Figure 12:
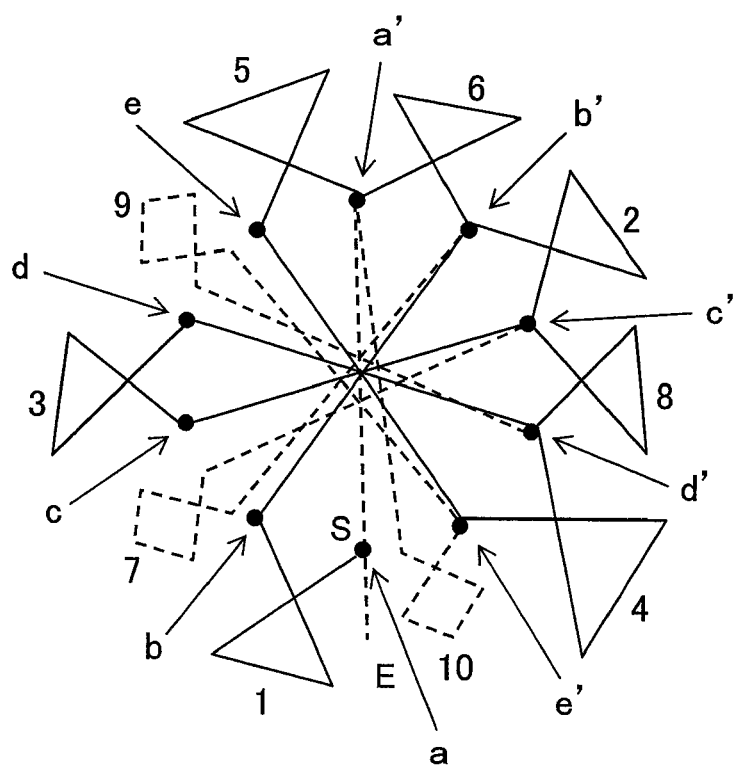
FIG. 12 is a view showing a fifth embodiment of the present invention.

FIG. 12 is a view showing a fifth embodiment of the present invention. The fifth embodiment differs from the above-described first to fourth embodiments in that the employed type-B winding is a winding whose both opposite ends are connected to respective commutator segments located radially opposite to usual adjacent commutator segments (see FIG. 5(B)). As in the case of the above-described examples, in the fifth embodiment shown in FIG. 12, the type-A winding is represented by a triangle of solid lines, and the type-B winding is represented by a diamond of broken lines. Numbers attached to respective windings indicate a winding sequence. The illustrated example has three type-B windings, one of which is such that only its one end is connected to a commutator segment located radially opposite to a usual adjacent commutator segment and two of which are such that both their opposite ends are connected to respective commutator segments located radially opposite to usual adjacent commutator segments. Thus, when each pair of winding coils consists of two radially opposed winding coils, each of the three pairs consists of the type-A winding and the type-B winding, and each of the remaining two pairs consists of the two type-A windings. Further, the type-A winding and the type-B winding which are located radially opposite each other can be reversed in winding type.

Next, winding will be described. As shown in FIG. 12, the commutator segment a serves as the winding start point S and the winding end point E. As in the case of the above-described example shown in FIG. 8, first, the first to fifth windings are wound as the type-A windings. However, in the example shown in FIG. 12, subsequently, the sixth and eighth windings are wound also as the type-A windings. The seventh, ninth, and tenth windings are wound as the type-B windings. The seventh and ninth windings are such that both their opposite ends are connected to respective commutator segments located radially opposite to usual adjacent commutator segments. The tenth winding is such that only its one end is connected to a commutator segment located radially opposite to a usual adjacent commutator segment. Thus, as in the case of the above-described examples, one short circuit wire is used for every short circuit connection of radially opposed commutator segments, and a total number of the short circuit wires is half (5) the number (10) of commutator segments. Thus, the number of electric wires hooked at every commutator segment can be reduced to two or less. Also, continuous winding (winding without intermediate cutting) by use of one or two wires is possible.

Figure 13:
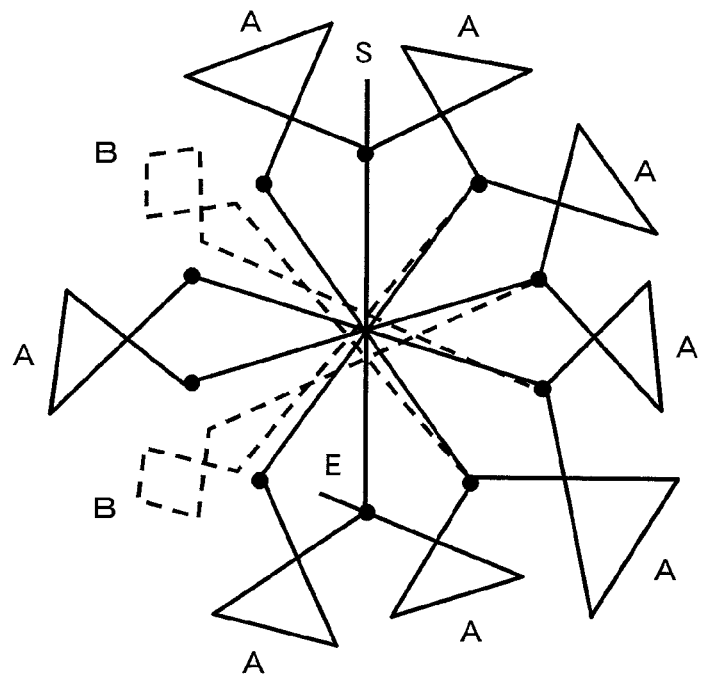
FIG. 13 is a view showing a sixth embodiment of the present invention.

FIG. 13 is a view showing a sixth embodiment. The sixth embodiment differs from the fifth embodiment in use of two type-B windings. FIG. 13 shows an example in which, when each pair of winding coils consists of two radially opposed winding coils, each of two pairs consists of the type-A winding and the type-B winding, and each of the remaining three pairs consists of the two type-A windings. As mentioned above, the present invention can be applied to a DC miniature motor in which the number of rotor poles and the number of commutator segments are the same even number equal to or greater than six represented by 2×N (N is an integer). When N is an even number, the maximum number of pairs each consisting of the two type-A windings is N/2. When N is an odd number, the maximum number of pairs each consisting of the two type-A windings is (N+1)/2. Thus, when N is an even number, the number of pairs each consisting of the type-A winding and the type-B winding is at least N/2. When N is an odd number, the number of pairs each consisting of the type-A winding and the type-B winding is at least (N−1)/2. In the case of the example of FIG. 13 having 10 (N=odd number 5 (pairs)) windings (rotor poles), the maximum number of pairs each consisting of the two type-A windings is (5+1)/2=3. The number of pairs each consisting of the type-A winding and the type-B winding is at least (5−1)/2=2.

Figure 14:
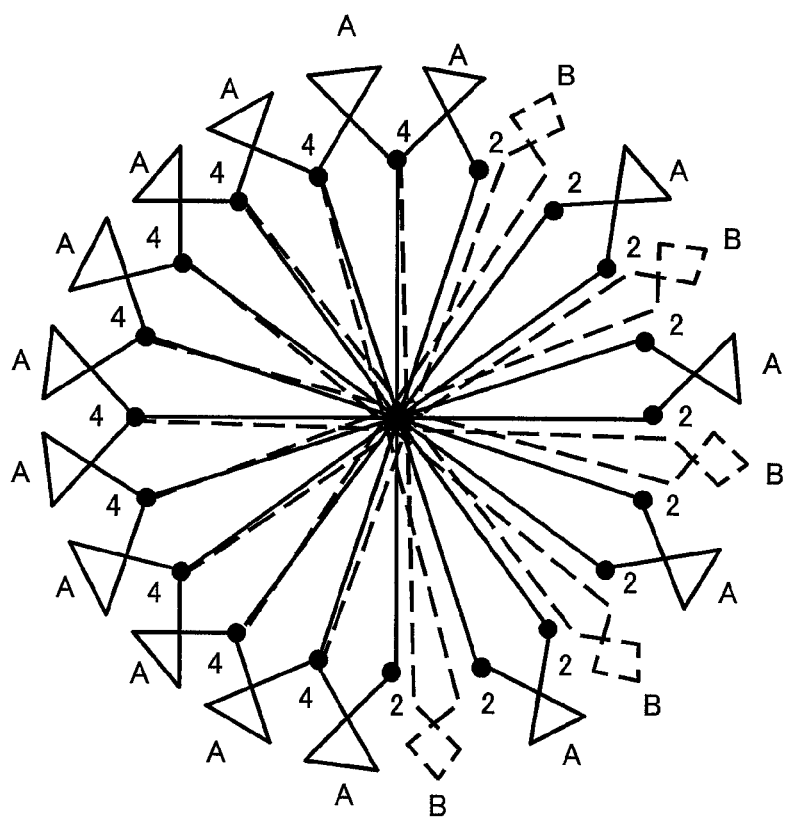
FIG. 14 is a view showing a seventh embodiment of the present invention.

FIG. 14 is a view showing a seventh embodiment of the present invention. The seventh embodiment differs from the first to sixth embodiments in that the number of rotor poles is 20 (N=even number 10 (pairs)). As mentioned above, since N is an even number, the maximum number of pairs each consisting of the two type-A windings is N/2=5, and the number of pairs each consisting of the type-A winding and the type-B winding is at least 5. FIG. 14 shows an example having the maximum number of pairs; i.e., five pairs, each consisting of the two type-A windings. In FIG. 14, numbers attached to the commutator segments indicate the number of hooked wires.

Figure 15:
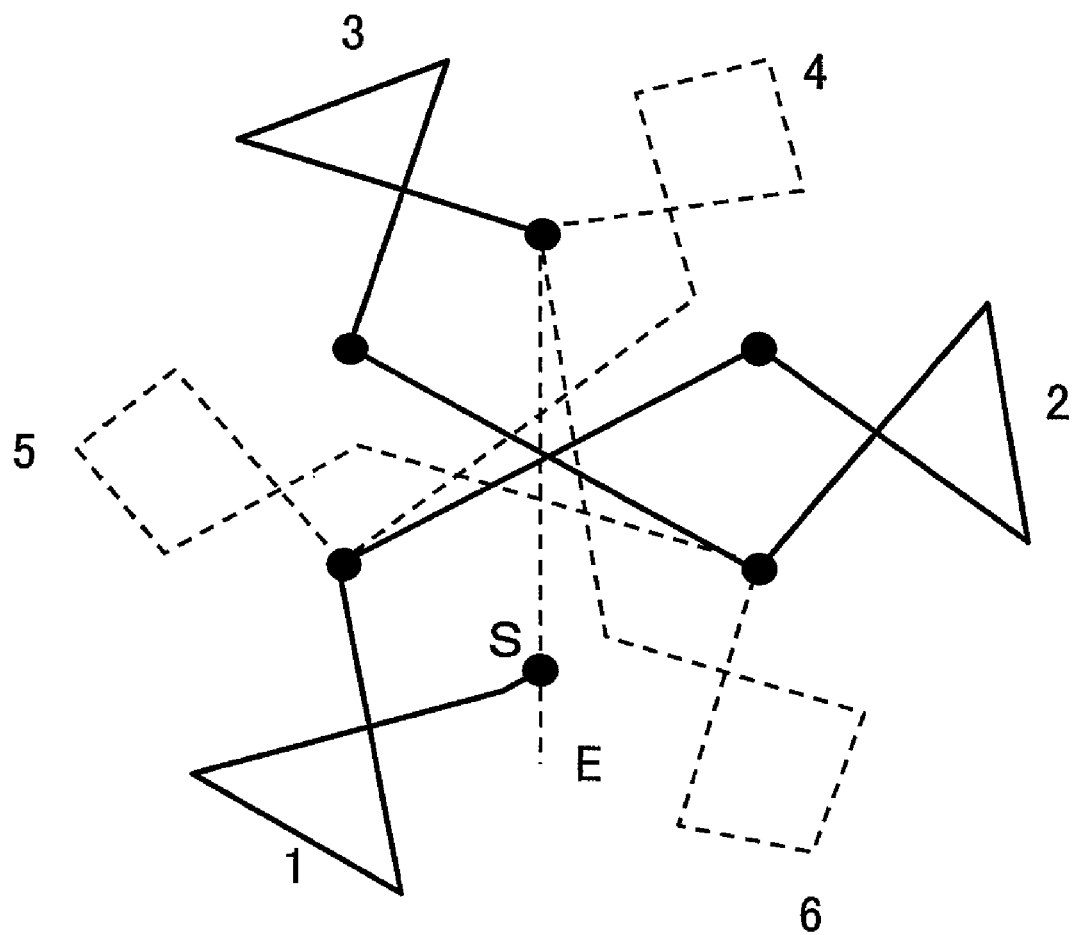
FIG. 15 is a view showing an eighth embodiment of the present invention.

FIG. 15 is a view showing an eighth embodiment of the present invention. The eighth embodiment is a DC miniature motor which has a 4-pole field and one or two pairs of brushes and in which the number of rotor poles and the number of commutator segments are the same number of six (even number). The eighth embodiment shows that the present invention is applicable so long as the number of rotor poles and the number of commutator segments are the same even number. Winding starts from the winding start point S and is performed up to the sixth winding in ascending order of number.

The invention claimed is:

1. A miniature motor, comprising:
a motor casing comprising an inner circumferential surface;
magnets mounted on said inner circumferential surface of said motor casing, wherein N and S poles of said magnets are alternatingly inverted, so as to serve as field magnets;
a rotary shaft;
an even number of rotor poles; and
a commutator having the same number of commutator segments as that of the rotor poles, said commutator segments being fixed on said rotary shaft, said commutator segments being opposite said rotor poles with respect to an axial direction of said rotary shaft, each of the rotor poles having at least one salient magnetic pole core and a winding wound about said at least one salient magnetic pole core, opposite ends of the winding being connected to respective commutator segments, and a short circuit wire connecting two commutator segments located radially opposite each other, wherein the winding connected to the commutator segments being a combination of first-type windings and second-type windings, wherein opposite ends of the first-type winding are connected to a pair of adjacent commutator segments, said pair of adjacent commutator segments having a predetermined positional relation with said winding, one end of said second-type winding being connected to one of said commutator segments located radially opposite to one of said pair of adjacent commutator segments, another end of said second-type winding being connected to one of the other of the pair of adjacent commutator segments and another one of the commutator segments located radially opposite to the other of the pair of adjacent commutator segments, wherein only one short circuit wire is used for every short circuit connection of radially opposed commutator segments.

2. A miniature motor according to claim 1, wherein, when the number of the commutator segments equal to the even number of the rotor poles is represented by 2×N, N is an integer, and each pair of windings consists of two windings located radially opposite each other,
the first-type windings and the second-type windings are used in combination such that, when N is an even number, each of at least N/2 pairs consists of the first-type winding and the second-type winding and each of the remaining pairs consists of the first-type winding and the second-type winding or consists of the two first-type windings.

3. A rotor of a miniature motor, comprising:
an even number of rotor poles; and
a commutator having the same number of commutator segments as that of the rotor poles are fixed on a rotary shaft, said commutator segments being opposite said rotor poles with respect to an axial direction of the rotary shaft, each of the rotor poles having at least one salient magnetic pole core and a winding wound about said at least one salient magnetic pole core, opposite ends of the winding being connected to respective commutator segments, and two commutator segments located radially opposite each other being connected by a short circuit wire, wherein at least one electric wire is hooked to an electric wire connection portion of each of the commutator segments.

4. A rotor of a miniature motor according to claim 3, wherein, when the number of the commutator segments equal to the even number of the rotor poles is represented by 2×N, N is an integer, and each pair of commutator segments consists of two commutator segments located radially opposite each other,
each of (N−1) pairs out of a total of N pairs consists of one of said commutator segments with four electric wires arranged thereon, and another one of said commutator segments with two electric wires arranged thereon, and
the remaining one pair including commutator segments defining a winding start point and a winding end point, wherein the one pair consists of a commutator segment with four electric wires arranged thereon, and a commutator segment with two electric wires arranged thereon and defining said winding start point and said winding end point when the winding starts and ends at the same commutator segment wherein the one pair consists of two commutator segments with three electric wires arranged thereon respectively when winding starts and ends at respectively different commutator segments located radially opposite each other.

5. A rotor of a miniature motor according to claim 4, wherein the windings each connected to the commutator segments are a combination of first-type windings and second-type windings, the first-type winding being connected to adjacent commutator segments such that one end of the first-type winding is connected to one of the adjacent commutator segments and the other end of the first-type winding is connected to the other one of the adjacent commutator segments, the second-type winding being connected to commutator segments such that at least one end of the second-type winding is connected to a commutator segment located radially opposite to one of adjacent commutator segments.

6. A rotor of a miniature motor according to claim 5, wherein, when each pair of windings consists of two windings located radially opposite each other, the first-type windings and the second-type windings are used in combination such that, when N is an even number, each of at least N/2 pairs consists of the first-type winding and the second-type winding and each of the remaining pairs consists of the first-type winding and the second-type winding or consists of the two first-type windings.

7. A rotor of a miniature motor according to claim 6, wherein N first-type windings and N second-type windings are arranged alternatingly adjacent to one another and in a radially opposed relation.

8. A rotor of a miniature motor according to claim 6, wherein the first-type windings and the second-type windings are arranged alternatingly adjacent to one another and in a radially opposed relation, except for one first- or last-wound winding, the first- or last-wound winding is a first-type winding located radially opposite another first-type winding.

9. A rotor of a miniature motor according to claim 6, wherein (N−1) second-type windings are arranged adjacent to one another, and (N+1) first-type windings are arranged adjacent to one another.

10. A rotor of a miniature motor according to claim 6, wherein, adjacently to one first-type winding, (N−1) second-type windings are arranged adjacent to one another, and N first-type windings are arranged adjacent to one another.

11. A rotor of a miniature motor according to claim 6, wherein each of the plurality of second-type windings is a second-type winding whose one end only is connected to a commutator segment located radially opposite to one of adjacent commutator segments or a second-type winding whose both ends are connected to respective commutator segments located radially opposite to the adjacent commutator segments.

12. A manufacturing method for a miniature motor including magnets mounted on an inner circumferential surface of a motor casing in such a manner that their N and S poles are alternatingly inverted, so as to serve as field magnets, an even number of rotor poles and a commutator having the same number of commutator segments as that of the rotor poles are fixed on a rotary shaft, said commutator segments being opposite said rotor poles with respect to an axial direction of said rotary shaft, each of the rotor poles having at least one salient magnetic pole core and a winding wound about said at least one salient magnetic pole core, opposite ends of the winding are connected to respective commutator segments, and a short circuit wire connects two commutator segments located radially opposite each other, the manufacturing method comprising:
  continuously winding first-type windings and second-type windings in combination by use of one or two electric wires so as to form the windings each connected to the commutator segments;
  connecting opposite ends of the first-type winding to a pair of adjacent commutator segments, said pair of adjacent commutator segments having a predetermined positional relationship with said winding;
  connecting one end of the second-type winding to one of said commutator segments located radially opposite to one of a said pair of adjacent commutator segments; and
  connecting another end of said second-type winding to one of the other of said pair of adjacent commutator segments and another one of said commutator segments located radially opposite the other of said pair of adjacent commutator segments, wherein only one short circuit wire is used for every short circuit connection of radially opposed commutator segments.

13. A manufacturing method for a miniature motor according to claim 12, wherein, when the number of the commutator segments equal to the even number of the rotor poles is represented by 2×N, N is an integer, and each pair of windings consists of two windings located radially opposite each other, the first-type windings and the second-type windings are used in combination such that, when N is an even number, each of at least N/2 pairs consists of the first-type winding and the second-type winding and each of the remaining pairs consists of the first-type winding and the second-type winding or consists of the two first-type windings.

14. A miniature motor according to claim 1, wherein, when the number of the commutator segments equal to the even number of the rotor poles is represented by 2×N, N is an integer, and each pair of windings consists of two windings located radially opposite each other, the first-type windings and the second-type windings are used in combination such that, when N is an odd number, each of at least (N−1)/2 pairs consists of the first-type winding and the second-type winding and each of the remaining pairs consists of the first-type winding and the second-type winding or consists of the two first-type windings.

15. A rotor of a miniature motor according to claim 5, wherein, when each pair of windings consists of two windings located radially opposite each other, the first-type windings and the second-type windings are used in combination such that, when N is an odd number, each of at least (N−1)/2 pairs consists of the first-type winding and the second-type winding and each of the remaining pairs consists of the first-type winding and the second-type winding or consists of the two first-type windings.

16. A manufacturing method for a miniature motor according to claim 12, wherein, when the number of the commutator segments equal to the even number of the rotor poles is represented by 2×N, N is an integer, and each pair of windings consists of two windings located radially opposite each other, the first-type windings and the second-type windings are used in combination such that, when N is an odd number, each of at least (N−1)/2 pairs consists of the first-type winding and the second-type winding and each of the remaining pairs consists of the first-type winding and the second-type winding or consists of the two first-type windings.

* * * * *